J. LINCOLN.
Thrashing Machine.
No. 1,590. Patented May 8, 1840.
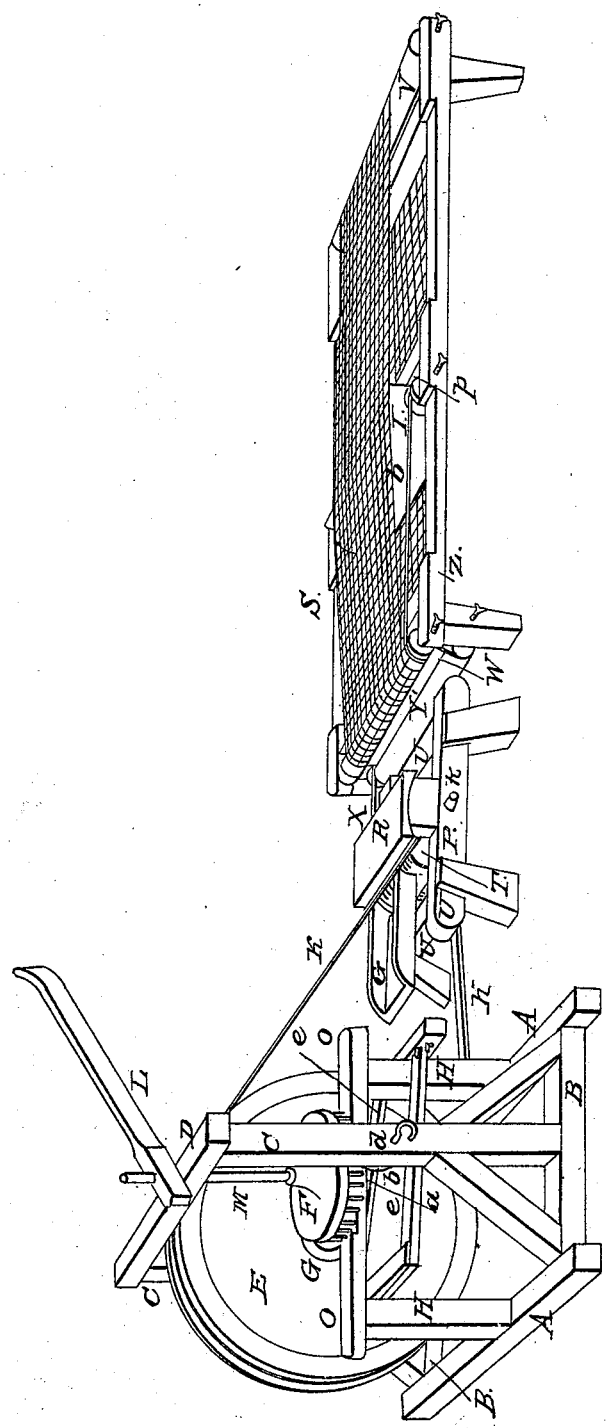

UNITED STATES PATENT OFFICE.

JESSE LINCOLN, OF UNIONTOWN, PENNSYLVANIA.

SHAKING THE SCREEN OR APRON IN THRESHING-MACHINES THAT CARRIES THE STRAW FROM THE THRESHING-CYLINDERS.

Specification of Letters Patent No. 1,590, dated May 8, 1840.

*To all whom it may concern:*

Be it known that I, JESSE LINCOLN, of Uniontown, in the county of Fayette and State of Pennsylvania, have invented a new and useful Improvement on Machines for Threshing Grain; and I do hereby declare that the following is a full, clear, and exact description of the construction and operation of the same, reference being had to the annexed drawing, making a part of this specification.

Figure 1 is a perspective view.

Similar letters refer to similar parts in the figures.

A B C D represents the frame work of the machine.

H H are two upright posts, supporting the beam O O.

$a$, is the axle of the master wheel, E. This axle works on pivots, as seen at $b$, and is supported upon screws $d$ $d$ passing through the upright timbers C C, and when the machine is moved by manual power the axle is made in the form of a crank, (as represented in the drawing,) which is double, and a treadle $e$ $e$ is used; but when horse power is used this axle is made straight. The wallower G, as well as the master wheel E, is firmly fixed upon the axle $a$.

F is the horizontal wheel whose axle M, works in a socket on the beam O O. This axle extends upward through the beam D, and on the end of it is fixed the lever L, to which the horse power is applied.

U P is the frame work supporting the cylinder T, which cylinder turns upon pivots on the screws K K (only one of which is seen in the figure).

R is a concave piece of timber filled on the under side with, spikes, among which the spikes on the cylinder T work.

Q is the hopper through which the grain is put into the machine.

K K is a strap, passing over the master wheel E, and also over a pulley fixed on the end of the cylinder T, the upper part, K', of which strap may be made to pass under a roller fixed so low that a horse may step over it, and thus pass between the large frame A B C D, and the part P which contains the cylinder, if required.

The diameter of the master wheel E is 6 feet more or less, and the breadth of the rim 4 inches. The middle part of this wheel is made light and the rim heavy, so that it may act as a balance wheel as well as a band wheel. The diameter of the wallower G is 6 inches, more or less. This wallower contains rounds or teeth. The diameter of the horizontal wheel F is $3\frac{1}{2}$ feet, more or less. All these wheels may be made of metal or wood. The diameter of the pulley fixed on the end of the cylinder T is 6 inches.

The horse power being applied at the end of the lever L turns the horizontal wheel F. The teeth of this wheel taking into the rounds of the wallower G gives motion to it, and with it to the master wheel E. The strap K K passing over the master wheel E, and over the pulley on the end of the cylinder T, gives motion to the cylinder. To conduct the straw from the machine to any desirable place when it is operating, also to screen the grain and thereby save the expense of raking. By using this improvement the machine can be kept constantly running so as to save the time necessary to stop to remove or carry the grain from the machine, which takes about half the time of any machine now in use. By which improvement together, double the work can be done by less hands and power by one-half. The part to effect this object may be thus described: Make a small frame Z 3 feet wide and 10 feet long; set this frame in front of the cylinder T, where the grain and straw fall out of the machine, with two rollers Y Y on the end of the frame next to the cylinder one precisely under the other, the lower one Y' 2 inches in diameter, the upper one 3 inches. A two inch pulley is fixed on the end of the axle of the cylinder T opposite to the end where the strap K is placed leading from the horse power to the cylinder. On this pulley is placed a small band X leading to a two inch pulley on the under roller Y' from which a band W leads to the upper roller. At the far end of the frame is placed a 3-inch roller V around which is placed a net work screen S of such openings as to let the grain through and conduct the straw away. In the middle of the frame is placed a flat roller I passing between the screen, on which is a two inch pulley with a small band leading from it to the 3 inch pulley on the upper front roller, said roller I is three inches wide and one inch thick and when in motion it will so shake the whole screen as to clear the straw from the grain. The band X from the cylinder gives motion to the lower roller Y′ in front; the band W from the lower roller to the upper, the bands being at the ends of the rollers, so as not to interfere with the motion of the network screen S, and the band b passing from the upper roller in front to the middle one gives motion to it, thus operating the whole machine, all the rollers working on pivots, thereby decreasing the friction and of course the power necessary to operate it. The extreme end of the frame may be elevated to any necessary height to convey off the straw completely.

What I claim as my invention and desire to secure by Letters Patent consists in—

The combination of the flat roller with the revolving screen as before described.

JESSE LINCOLN.

Witnesses:
J. H. DEFORD,
EDWARD HYDE.